United States Patent

[11] 3,572,012

| [72] | Inventors | Charles T. Martin;<br>Vincent E. Schoeck, Hagerstown, Md. |
|---|---|---|
| [21] | Appl. No. | 777,294 |
| [22] | Filed | Nov. 20, 1968 |
| [45] | Patented | Mar. 23, 1971 |
| [73] | Assignee | The Carborundum Company<br>Niagara Falls, N.Y. |

[54] DUST COLLECTOR
9 Claims, 3 Drawing Figs.

[52] U.S. Cl. .................................................. 55/304, 55/341, 55/379
[51] Int. Cl. ................................................ B01d 46/04
[50] Field of Search ............................................. 55/304, 305, 300, 341, 379; 210/332

[56] References Cited

UNITED STATES PATENTS

| 1,316,883 | 9/1919 | Fatscher ......................... | 55/304 |
| 1,747,131 | 2/1930 | Parsons ......................... | 55/304 |
| 1,928,670 | 10/1933 | McCrery ......................... | 55/304 |
| 2,612,236 | 9/1952 | Vedder ......................... | 55/304 |
| 2,667,233 | 1/1954 | Vedder ......................... | 55/304 |

FOREIGN PATENTS

| 437,857 | 11/1926 | Germany ........................ | 55/305 |
| 937,291 | 9/1963 | Great Britain ................ | 55/304 |

*Primary Examiner*—Frank W. Lutter
*Assistant Examiner*—Bernard Nozick
*Attorney*—Karl W. Brownell ABSTRACT: A collector system for collecting impurities such as dust includes a housing having a plurality of compartmentalized filter bags and a shaker for causing the impurities to fall from the bags into collecting means at the bottom of the bags. At least one rod is secured within the top of each bag and has a plurality of exposed hooks slidably mounted upon a support tube disposed above the bags in a direction transverse to the compartments of each bag. The tube and hooks have complementary noncircular shapes and the tube is secured to the shaker mechanism to transmit its movement to the bags.

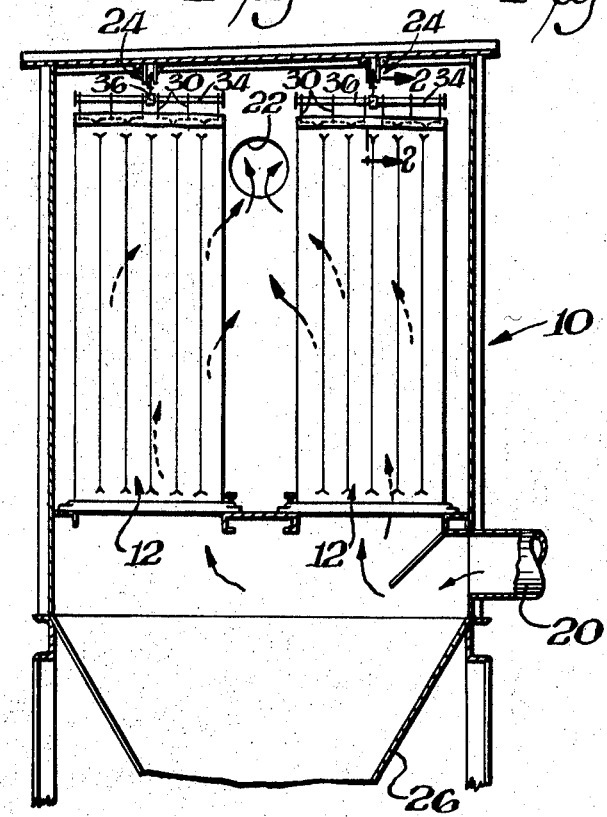
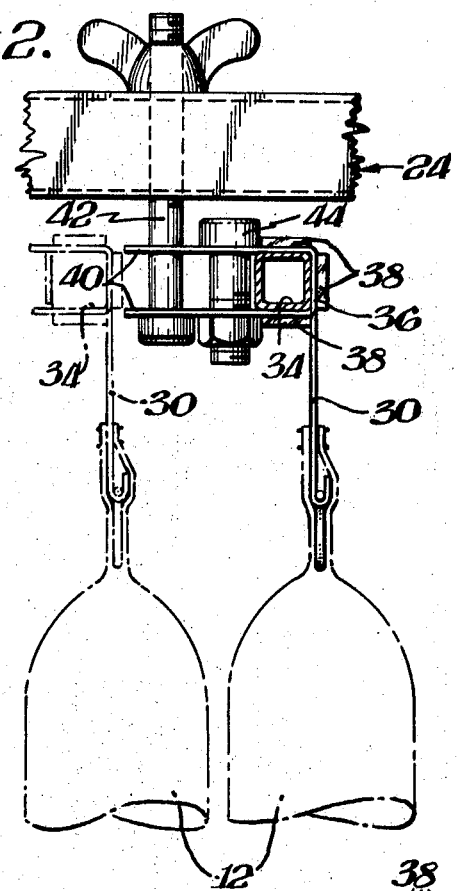
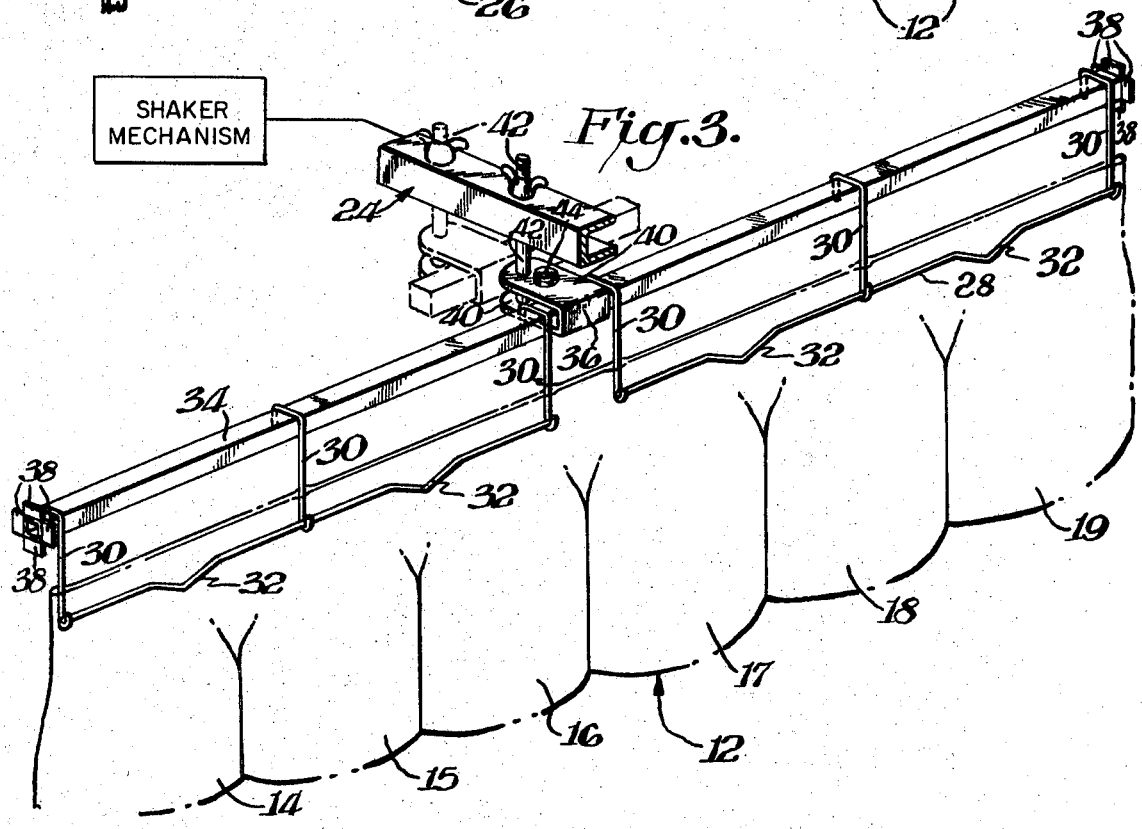

DUST COLLECTOR

BACKGROUND OF INVENTION

U.S. Pat. No. 2,612,236 relates to a particularly effective dust collector arrangement. This arrangement includes cloth bags having seams sewn vertically up the bags to form a plurality of parallel tubes with an inlet opening common to all. The liberal size of the common opening reduces inlet velocity thereby reducing materially the abrading tendency of the airborne dust and increasing the wear-life of the bag. Additionally, the patented arrangement is particularly desirable where space limitations are an important consideration.

In arrangements such as indicated above it is necessary to securely attach the bags to a shaker mechanism so that the buildup of dust can be prevented and the shaker mechanism is utilized to its maximum efficiency. An opposing consideration, however, is the need to have the bags readily detachable so that they can be easily replaced and securely and quickly installed. The patented arrangement includes a wire rod attached to the top of each bag and having spaced loops which are detachably secured to hanger hooks fixedly mounted upon an overhead bar which in turn is connected to the shaker mechanism. While this arrangement provides the desired stable attachment it does not lend itself to rapid removability and replacement of bags.

SUMMARY OF INVENTION

An object of this invention is to provide a bag support for a dust or impurity collector system such as indicated above.

A further object is to provide such a bag support which effectively transmits the motion from the shaker mechanism to the bags, while lending itself to being readily detached.

In accordance with this invention a dust or impurity collector system is provided which has a plurality of compartmentalized filter bags in a housing for removing the impurities from for example dust-laden air. At least one rod is secured within the top of each bag and has a plurality of hooks thereon. A support tube is connected to a shaker mechanism and is disposed in a direction transverse to the bag compartments. The tube is of a noncircular cross section and the hooks have a complementary noncircular shape so as to be slidably mounted over the tube.

The rod may be a wire having offset portions between pairs of hooks and disposed away from the hooks. The tube may include integral stop tabs at its ends which may be formed by slitting the corners of the tube and bending the slit sides away from the remainder of the tube. The tube may be inserted in a U-shaped spring clip which is connected to the shaker mechanism by a fastener secured in apertures in the clip legs. Additionally, the clip may also include a second set of apertures for receiving an abutment member which prevents or limits sliding movement of the tube.

THE DRAWINGS

FIG. 1 is a cross-sectional view of a collector system in accordance with this invention;

FIG. 2 is a cross-sectional view taken through FIG. 1 along the line 2-2; and

FIG. 3 is a perspective view of a portion of the system shown in FIGS. 1-2.

DETAILED DESCRIPTION

FIG. 1 illustrates an impurity collector system of the type generally described in U.S. Pat. No. 2,612,236, the details of which are incorporated herein by reference thereto. Such systems are used for example to remove dust from air by means of baglike filters. As indicated therein the system includes a housing 10 having a plurality of compartmentalized filter bags 12. The compartments are formed by sewing the bags vertically so that for example each bag contains six different compartments 14—19 (FIG. 3). The dust-laden air is fed into housing 10 through inlet 20 and the air is directed through bags 12 where it emerges through outlet 22. As the air passes through the bags 12 the dust or other impurities are collected on the inner surface of the bags. To prevent excessive buildup of the dust in the bags, a shaker mechanism 24 is provided to shaker the bags so that the caked dust will break and fall to the bottom of housing 10 into the collector 26.

This invention is particularly concerned with a mounting arrangement to connect the bags to the shaker mechanism so that the bags will be both securely connected to the mechanism so as to maximize the efficiency of the mechanism, and yet the bags are easily removable. As indicated in FIGS. 2-—3, this mounting arrangement includes a pair of wire rods 28 which are sewn into the top end of each bag. A plurality of hooks 30 are mounted on each rod. Advantageously rod or wire 28 includes an offset portion 32 between pairs of hooks 30 and disposed in a direction away from the hooks. Offset portions 32 transmit the shaking action from shaker mechanism 24 down the cloth bags. If portions 32 were not present rod 28 would turn in the cloth, but with the inclusion of portions 32 the energy is transferred through the bags. Advantageously, each compartment has a hook disposed above it.

A tubular support member 34 which is for example square in cross section is also arranged above each bag and is secured to the shaker mechanism 24 by means of clip 36 as later described. Hooks 30 have a complementary shape to snugly yet slidably fit over support tube 34. Advantageously, the corners at both ends of tube 34 are slit and the slit sides are bent away from the tube to form integral tabs 38 which act as stops to prevent hooks 30 from sliding off tube 34.

Clip 36 is a spring clip which is U-shaped have a pair of spaced parallel legs 40. Each leg 40 has a pair of apertures through which a fastener 42 is inserted to connect the clip 36 to the shaker mechanism 24. Since clip 36 also has a shape which complements the shape of tube 34, the tube fits snugly therein and is prevented from sliding out of the clip by means of abutment member such as an ordinary bolt 44 as most clearly shown in FIG. 2.

By the arrangement described above the bags can be quickly installed and removed from the conventional dust collector unit such as exemplified in U.S. Pat. No. 2,612,236. With the hooks arranged as shown in the top of each bag the cloth bags are held tightly on the support tube 34 to maximize the efficiency of shaker mechanism 24 without adversely affecting the removability of the bags.

We claim:

1. In an impurity collector system having a housing, a gas inlet and a gas outlet in said housing, a plurality of compartmentalized filter bags closed at the top and mounted in said housing with open ends at the bottom of the bags, means for feeding impurity laden gas into said housing and into the bags whereby the impurities are removed by said bags from the gas, impurity collecting means at the bottom of said bags, a shaker mechanism, mounting means connecting said bags to said shaker mechanism for causing the impurities to fall from said bags into said collecting means, said mounting means including at least one rod secured within the top of each said bag, a plurality of exposed hooks on each rod, a support tube disposed above each said bags in a direction transverse to the compartments of each said bag, said tube being of substantially uniform rectangular cross section, said hooks having a complementary substantially rectangular shape, said hooks being slidably mounted and hooked over the top and sides of said support tube, at least one of the hooks being positioned adjacent each end of the top of each of said bags, means on said tube for preventing the hooks from sliding off the tube, and said support tube being secured to said shaker mechanism.

2. In a system as set forth in claim 1 wherein the remote end of each hook is spaced from a portion of the hook diametrically opposite thereof by a distance at least as great as the thickness of its tube whereby each hook may be removed from its tube by a simple upward lifting motion.

3. In a system as set forth in claim 2 wherein said rod is a wire having offset portions between pairs of hooks and disposed away from said hooks.

4. In a system as set forth in claim 3 wherein said means on said tube includes integral stop tabs at its ends.

5. In a system as set forth in claim 4 wherein said ends of said tube are slit at its corners and the slit sides are bent away from the remainder of said tube to form said integral tabs.

6. In a system as set forth in claim 5 wherein a hook is disposed above each compartment of each compartmentalized bag.

7. In a system as set forth in claim 6 wherein a pair of said rods is sewn into the top of each bag, said tube being inserted in a clip, said clip being connected to said shaker mechanism, and said clip being disposed above and between said pair of rods.

8. In an impurity collector system having a housing, a gas inlet and a gas outlet in said housing, a plurality of compartmentalized filter bags mounted in said housing, means for feeding impurity laden gas into said bags whereby the impurities are removed by said bags from the gas, impurity collecting means at the bottom of said bags, a shaker mechanism, mounting means connecting said bags to said shaker mechanism for causing the impurities to fall from said bags into said collecting means, said mounting means including at least one rod secured within the top of each bag, a plurality of exposed hooks on each rod, a support tube disposed above said bags in a direction transverse to the compartments of each bag, said tube being of noncircular cross section, said hooks having a complementary noncircular shape, said hooks being slidably mounted over said support tube, said support tube being secured to said shaker mechanism, said rod being a wire having offset portions between pairs of hooks and disposed away from said hooks, said tube including integral stop tabs at its ends, said ends of said tube being slit at its corners and the slit sides are bent away from the remainder of said tube to form said integral tabs, a hook being disposed above each compartment of each compartmentalized bag, a pair of said rods being sewn into the top of each bag, said tube being inserted in a clip, said clip being connected to said shaker mechanism, said clip being disposed above and between said pair of rods, said tubes being square in cross section, said hooks being formed as squared-off U's fitting snugly over said tube, said clip being a spring clip and being U-shaped with parallel legs spaced apart the thickness of said tube for snugly receiving said tube, and apertures in said clip legs receiving fastener means connected to said shaker mechanism.

9. In a system as set forth in claim 8 wherein said clip includes a second set of apertures in its legs, and an abutment member secured to said clip to limit the sliding movement of said tube.